J. L. KRAFT.
PROCESS OF PREPARING CHEESE.
APPLICATION FILED FEB. 21, 1921.
1,400,171. Patented Dec. 13, 1921.
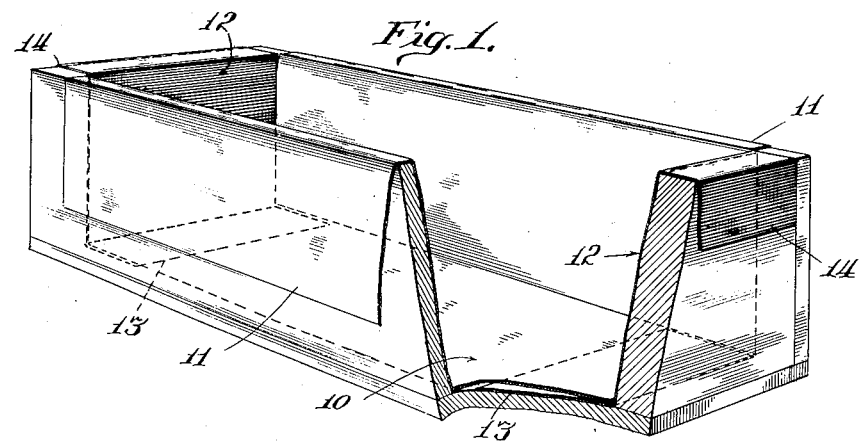
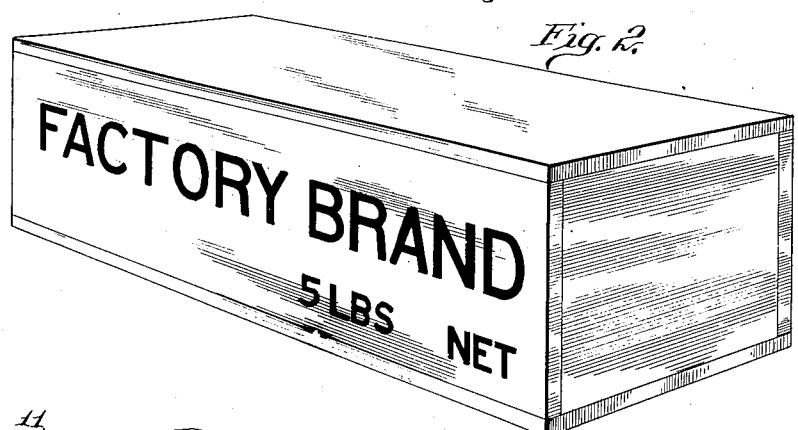
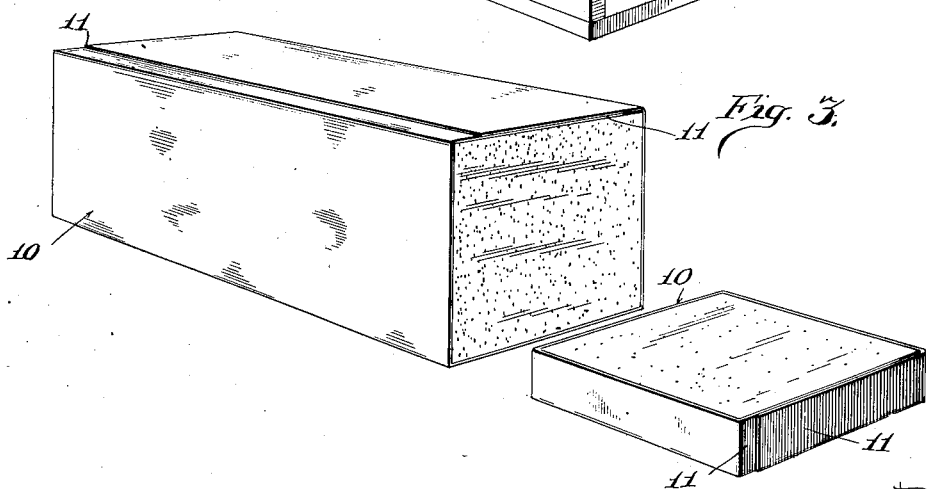
Inventor
James L. Kraft
By Fisher Towle Clapp & Soans
Attorneys

UNITED STATES PATENT OFFICE.

JAMES L. KRAFT, OF CHICAGO, ILLINOIS.

PROCESS OF PREPARING CHEESE.

1,400,171.          Specification of Letters Patent.      Patented Dec. 13, 1921.

Application filed February 21, 1921. Serial No. 446,674.

*To all whom it may concern:*

Be it known that I, JAMES L. KRAFT, a citizen of the United States, residing at Chicago, in the county of Cook and State of Illinois, have invented or discovered a certain new and Improved Process of Preparing Cheese, of which the following is a specification.

My invention relates to improvements in process for preparing cheese and has particular reference to a method of preparing for sale in convenient units cheese of a normally solid variety such as "American" cheese, which has been manufactured according to the Cheddar or analogous process in the ordinary country cheese factory.

With respect to the preliminary steps of my improved process, reference may be had to Patent No. 1,323,869, issued to me December 2, 1919, for process for treating cheese, in which patent I described a method of remaking from cheese of the character above referred to, cheeses similar to those of the Edam or Gowda types. Although the method of manufacturing such cheeses, as set forth in my previous patent above referred to, is eminently feasible and successful, it will be understood that the demand for Edam and Gowda cheeses is rather limited in this country compared with the demand for standard American cheese in other shapes.

It has been recognized for some time that there would be an extensive market for American cheese put up in relatively small units if it were possible to manufacture such units successfully and of such form as to be convenient to handle by the retailer and consumer without waste. It will be understood that on account of the round or curved shape of the ordinary American cheese heretofore manufactured and because of the presence of a hard rind unpalatable to most people, there has been substantial wastage of cheese, which wastage is obviously greater in a small cheese than in a large one.

Hence, it will be apparent that the principal objects of my invention are to prepare cheese of the type described, in units of such size and shape that can be readily sold to the smallest retailer without cutting the cheese or breaking the package; to provide such cheese units so prepared and packaged that the retailer can cut off and sell to the consumer any desired weight or quantity while at the same time drying out or spoilage of the unsold cheese is practically eliminated; to provide a cheese of the American variety which shall be free from objectionable rind or inedible skin; to provide cheese units which as such shall be practically odorless and also which will not absorb extraneous objectionable odors; to provide cheese units which may be stored for periods of many weeks without substantial drying out or other deterioration or loss of texture or flavor; to provide a cheese package which shall be highly attractive in appearance while at the same time being practical and convenient to handle, distribute and market both at wholesale and at retail; to provide an improved process of producing and preparing such units and in general to provide an improved product and process of the character referred to.

In the drawings which accompany this application I have illustrated in a conventional manner a packaged cheese unit prepared according to my invention.

In said drawings—

Figure 1 is a perspective view of the empty container, a corner of same being broken away.

Fig. 2 is a perspective view of the finished package.

Fig. 3 is a perspective view of the block after removal from the container.

In practising my invention, I employ initially the preliminary steps of my previously patented process. However, in view of the fact that according to the present invention I desire and secure an entirely different product, the later steps of the previous process are not followed, an entirely different process or method being practised for finishing the cheese.

In practising my improved process a number of cheeses of a normally solid variety, such as Cheddar, selected according to flavor, percentage of butter fat, condition of cure, etc., are cut up into small strips or chunks and comminuted in any suitable grinding machine. A charge of the ground up cheese is then introduced into a suitable mixing and heating vessel, said vessel being preferably provided with a jacket by means of which steam or circulating hot water may be employed to raise the temperature of the vessel. The vessel should also be provided with the necessary stirring devices consisting preferably of a set of power driven rotary paddles and a coöperating set of stationary or oppositely rotating paddles.

The inner receptacle is preferably equipped with a suitable cover to retain heat and also to prevent undue evaporation of moisture, it being understood that in order to facilitate the practising of the process and to secure proper texture and consistency of the final product a substantial percentage of water may be added to the comminuted cheese during or before the application of heat. The charge of comminuted cheese in the receptacle is heated gradually by turning on the steam or circulating hot water which supplies the outer jacket and during the application of heat the stirring devices are operated preferably continuously throughout the duration of the process or until the further application of heat is discontinued.

After the heat has been applied for a certain length of time, for example for from fifteen to thirty minutes, and the temperature has been raised from the ordinary room temperature to in the neighborhood of 130° to 150° F., the comminuted cheese mass has attained a plastic consistency somewhat like that of ordinary baker's dough, and in order to secure cheese of the finest flavor and texture the application of heat should preferably be discontinued when this stage has been reached. If the heating be continued further, for instance to 160° or 180° F., the rubber-like or doughy character of the cheese disappears, the fluidity increases until a creamy consistency results, and the resulting product, although quite edible and palatable, does not possess the texture which is ordinarily associated with that type of cheese which is being treated.

It will, of course, be understood that the handling of the heated material may be made somewhat easier by carrying the heat a little further than I have indicated, thereby securing a somewhat more fluid and more easily handled material. However, from the standpoint of flavor and texture I have found it desirable not to exceed a temperature of 150° F.

After the cheese mass has been heated sufficiently and has reached the desired consistency, the application of further heat is suspended, the material being now ready for the finishing steps of the process.

I have in readiness a number of containers each adapted to hold the desired quantity of the finished cheese. A convenient package for many purposes is one which will snugly contain a block weighing about five pounds and of cross section such that the cheese may be cut into slices of the right size to make ordinary sandwiches. The outer container which I use in practising my invention preferably has rigid sides and in the preferred form shown comprises a wooden box of the required cubical content. These boxes are made up in advance, the covers being left off, and before the cheese is introduced into the containers the boxes are lined with tinfoil.

Such lining preferably comprises a wide strip or sheet 10 having flaps 11 long enough to overlap substantially when folded over the top of the cheese, end strips 12 being also used to cover the ends of the brick, the lower end of each end piece having a part 13 overlapping with the bottom of the main strip 10 and also having an upper extension 14, which is arranged to fold over the top of the block and overlap the upper portions of the said main sheet 10. It will be understood that by the use of the three sheets of tinfoil comprising the main sheet 10 and the two end sheets 12, the block of cheese may be completely incased on all six sides.

Before placing the hot plastic or fluid cheese into the open box containers the mass is subdivided into portions of the desired weight, in the present instance five pounds. Each five-pound batch or unformed mass of cheese is then introduced directly into the container and after waiting a few seconds to permit the mass to flow into the corners of the container, the projecting side flaps and end flaps of the tinfoil are folded over the top of the brick. The cover is then pressed down upon the top of the block and nailed onto the box, which thus serves as a mold as well as a container for the finished package. When cooled it is ready for distribution to the trade or for immediate consumption, if desired.

The tinfoil lining with which the hot cheese mass comes directly into contact, sticks to the outer surfaces of the block, and when the block of cheese contracts slightly, which occurs on cooling, the tinfoil will follow the brick. Hence, there will be no tendency of the tinfoil to stick to the surfaces of the boards which form the rigid container.

Cheese put up according to my improved process will keep in a satisfactory manner without appreciable deterioration for a period of upward of three months, provided, of course, that it be kept in a reasonably cool place and in a reasonably dry atmosphere. Also, as an important feature of my invention, owing to the fact that the process has a substantial curing effect, the product is edible and palatable within a few hours after it has been packaged even if prepared largely from fresh or uncured cheeses.

The tinfoil coating on the block, although permitting the necessary slight "breathing" action, substantially prevents evaporation of the moisture present in the cheese. It also prevents the cheese from absorbing any objectionable extraneous odors which may be present in the wood of the box or in the place of storage and it also substantially does away with the rather penetrating cheesy smell which is usually in evidence where ordinary cheese is stored.

The package itself is of an attractive and practical character, and presents many advantages over the previous methods of distributing cheese to the trade. For instance, the manufacturer's trade-name or other descriptive data may be branded or printed on the outside of the box or on the inner covering of the cheese itself. The box is of such size that the retail purchaser may be served directly from such package, thereby insuring against substitution or palming off of different or inferior product.

There is also no waste in selling or serving the cheese. Usually the customer who goes into a retail store will purchase not more than from a half to two pounds of cheese at a time. It is a simple matter for the retailer to pry off the lid of the box and invert the latter, whereupon by reason of the contraction of the brick in cooling and because of the smooth tinfoil coating, the block will fall freely from the box, making it possible for the storekeeper to cut off from the end any desired thickness. It is not necessary to remove the tinfoil before slicing off the amounts purchased; in fact, I prefer not to disturb the tinfoil for the reason that it is a substantial protection against undue drying out of the cheese when the block is removed from the container.

It will be manifest that the block of cheese in its tinfoil wrapper presents a highly attractive appearance in the show case or other place where the cheese is displayed for sale. I find as a matter of fact that retailers of cheese packaged according to my improved process are enabled to secure a very substantial increase in price over that which they can secure for ordinary cheeses of the same general class from which my improved units are prepared.

It will be understood that the scope of my invention must be determined by reference to the appended claims, said claims being construed as broadly as possible consistent with the state of the art.

I claim:

1. The improvement in the art of preparing cheese of a normally solid variety, which consists in comminuting cheese which has previously been manufactured in a country factory, stirring and heating the same until the mass has attained a uniform consistency and is capable of flowing to assume the shape of a container, and inclosing definite portions of the fluid mass while still heated in substantially rigid containers lined with sheet material which will stick to the cheese rather than to the walls of the container and will contract with the cheese and which material is substantially impervious to moisture.

2. The improvement in the art of preparing cheese of a normally solid variety, which consists in comminuting previously manufactured cheese, stirring and heating the same until the mass has attained a uniform consistency and is capable of flowing to assume the shape of a container, and inclosing a definite portion of the fluid mass, while still heated, in a rectangular mold lined with metal foil, forming on cooling, a finished mercantile unit from which the retailer may cut slices or sections of like area and of different thicknesses to suit the particular weights desired by the consumer.

3. The improvement in the art of preparing cheese of the Cheddar genus which consists in comminuting cheese which has been previously manufactured in a country cheese factory, stirring and heating the same until the mass has attained a uniform consistency and is capable of flowing to assume the shape of a container and inclosing a definite portion of the fluid mass, while still heated, in a rectangular wooden box lined with metal foil, and permitting the package to cool and thereby causing the metal foil to stick to the material and contract with same on cooling, the cooled package constituting a finished article of merchandise in condition to be shipped without further boxing and from which the resultant foil-coated block of cheese may be readily removed by the retailer for the purpose of severing from said block slices of like area and of different thickness to suit the particular weights desired by the consumer.

JAMES L. KRAFT.